(12) United States Patent
Mayni et al.

(10) Patent No.: US 11,993,102 B2
(45) Date of Patent: May 28, 2024

(54) TRUCK TIRE HAVING WATER FLOW ORIENTING TREAD FEATURE

(71) Applicant: Compagnie Generale des Etablissements Michelin, Clermont-Ferrand (FR)

(72) Inventors: Paul Andrew Mayni, Fountain Inn, SC (US); Daniel McEachern Hicks, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 510 days.

(21) Appl. No.: 17/275,449

(22) PCT Filed: Oct. 16, 2019

(86) PCT No.: PCT/US2019/056568
§ 371 (c)(1),
(2) Date: Mar. 11, 2021

(87) PCT Pub. No.: WO2020/096745
PCT Pub. Date: May 14, 2020

(65) Prior Publication Data
US 2022/0048335 A1 Feb. 17, 2022

Related U.S. Application Data

(60) Provisional application No. 62/757,953, filed on Nov. 9, 2018.

(51) Int. Cl.
*B60C 11/03* (2006.01)
*B60C 11/12* (2006.01)

(52) U.S. Cl.
CPC ...... *B60C 11/0323* (2013.01); *B60C 11/0302* (2013.01); *B60C 11/0306* (2013.01); *B60C 11/12* (2013.01); *B60C 2200/06* (2013.01)

(58) Field of Classification Search
CPC ............. B60C 11/0323; B60C 11/1281; B60C 11/124; B60C 11/03; B29D 2030/061
See application file for complete search history.

(56) References Cited

U.S. PATENT DOCUMENTS

| 5,158,626 A * | 10/1992 | Himuro ............... B60C 11/0302 |
| | | 152/209.28 |
| 2011/0168311 A1* | 7/2011 | Voss .................... B29D 30/0606 |
| | | 152/209.18 |

(Continued)

FOREIGN PATENT DOCUMENTS

| EP | 3381718 A1 | 10/2018 |
| KR | 101901064 B1 * | 9/2018 |

(Continued)

OTHER PUBLICATIONS

European Patent Office; International Search Report and Written Opinion for patent application PCT/US2019/056568, filed Oct. 16, 2019; Publisher: European Patent Office, Rijswijk, Netherlands; dated Jan. 7, 2020; pp. 1-12, enclosed.

*Primary Examiner* — Cedrick S Williams
*Assistant Examiner* — Thomas Frank Schneider
(74) *Attorney, Agent, or Firm* — Neal P. Pierotti

(57) ABSTRACT

A heavy truck tire tread (12) is provided that has a partially hidden longitudinal groove (22) with an undersurface channel (24) engaged by a longitudinal sipe (26). The partially hidden longitudinal groove (22) has a surface opening (28) that extends from a surface of the tread to the undersurface channel (24). The tread (12) has at least one of two features. The first feature is that the surface opening (28) extends from the surface to the undersurface channel (24) at an angle to the thickness direction such that the surface opening (28) at the surface is forward of the surface opening (28) at the undersurface channel (24) in the rolling direction (20). The second feature is that a lateral sipe (32) engages the surface (Continued)

opening (28) so that the first end is at the surface opening (28), and the second end is forward of the first end in the rolling direction (20).

13 Claims, 6 Drawing Sheets

(56) References Cited

U.S. PATENT DOCUMENTS

| | | | |
|---|---|---|---|
| 2011/0214789 A1* | 9/2011 | Cress | B29D 30/0606 |
| | | | 152/209.1 |
| 2015/0273950 A1* | 10/2015 | Martin | B60C 11/0306 |
| | | | 152/209.17 |
| 2018/0207990 A1* | 7/2018 | Dayet | B60C 11/0318 |
| 2018/0244111 A1* | 8/2018 | Zhu | B60C 11/0306 |
| 2018/0345733 A1* | 12/2018 | Ooba | B60C 11/1218 |
| 2020/0298625 A1* | 9/2020 | Zhu | B60C 11/1218 |

FOREIGN PATENT DOCUMENTS

| | | | | |
|---|---|---|---|---|
| WO | 2010030276 A1 | | 9/2008 | |
| WO | WO-2017016931 A1 | * | 2/2017 | ............. B60C 11/03 |
| WO | 2017039679 A1 | | 3/2017 | |
| WO | WO-2017039679 A1 | * | 3/2017 | ......... B60C 11/0302 |
| WO | WO-2017090332 A1 | * | 6/2017 | ............. B60C 11/03 |
| WO | 2017176280 A1 | | 10/2017 | |
| WO | WO-2017176280 A1 | * | 10/2017 | |

* cited by examiner

TRUCK TIRE HAVING WATER FLOW ORIENTING TREAD FEATURE

CROSS-REFERENCE TO RELATED APPLICATIONS

The present application is a 35 U.S.C. § 371 application of PCT/US19/56568 filed on Oct. 16, 2019 and entitled "Truck Tire Having Water Flow Orienting Tread Feature." PCT/US19/56568 claims priority to U.S. Patent Application No. 62/757,953 filed on Nov. 9, 2018 and entitled "Truck Tire Having Water Flow Orienting Tread Feature." PCT/US19/56568 and U.S. 62/757,953 are incorporated by reference herein in their entireties for all purposes.

FIELD OF THE INVENTION

The subject matter of the present invention relates to a truck tire that has a tread design with features for water evacuation. More particularly, the present application involves a tread with a partially hidden longitudinal groove that has flow orienting design features, and a tread with a lateral sipe that has flow orienting design features.

BACKGROUND OF THE INVENTION

Purchasers and users of truck tires seek improved rolling resistance in order to decrease the amount of fuel consumption of the vehicle during operation. In order to increase rolling resistance, tire manufacturers have begun to design truck tires with lower and lower tread depths to address this customer demand. In addition to lower tread depth, the void volume in heavy truck tires has likewise been trending downward. These two design constraints make it more difficult for the truck tire to evacuate water at high speeds. The build-up of water in front of and around truck tires may result in visco planing in which tire-ground contact is compromised along with an increase in vehicle braking distance. Although tread designs for heavy truck tires may improve certain performance characteristics such as rolling resistance, these tread designs may also function to diminish other performance characteristics of the tire. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
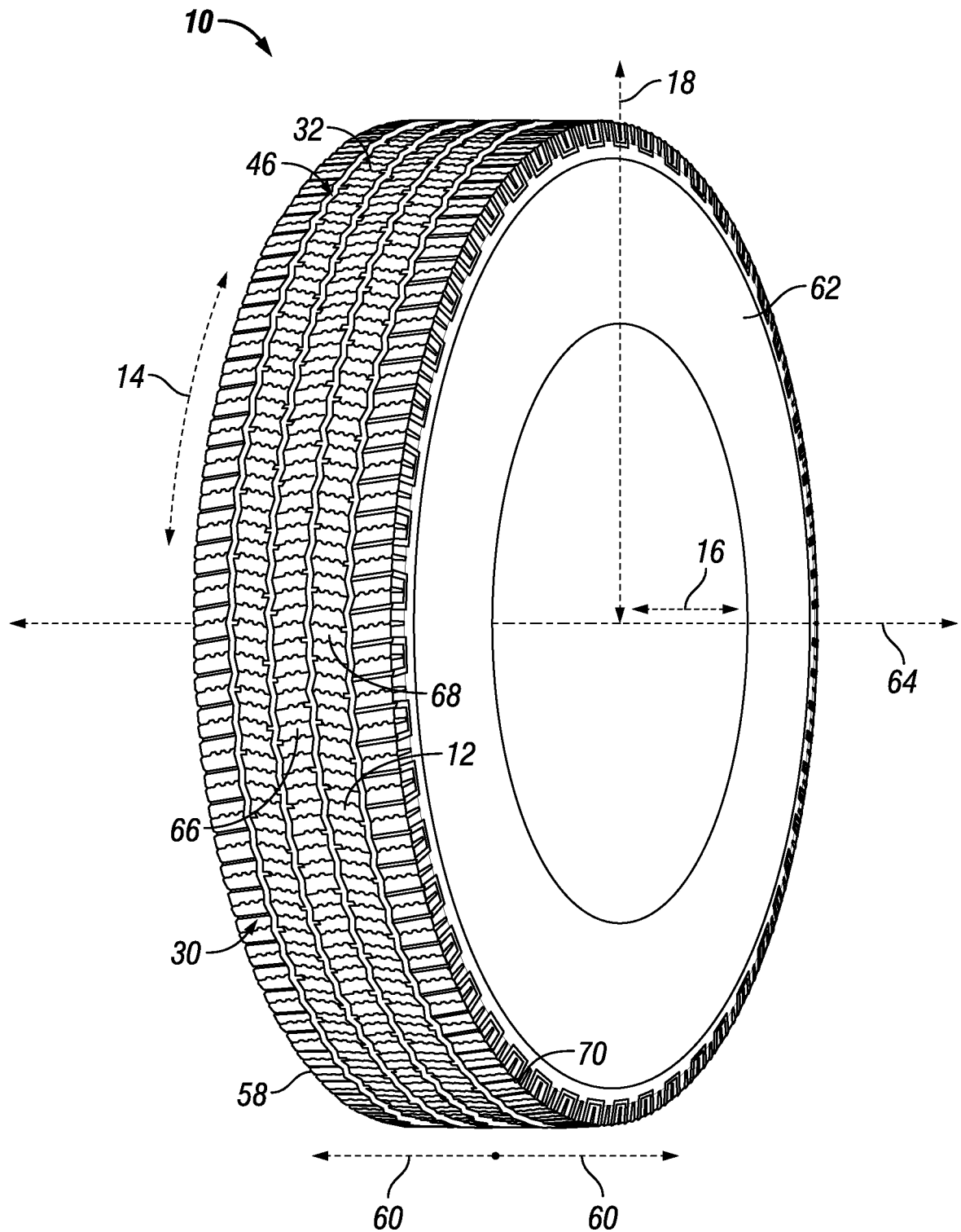
FIG. 1 is a perspective view of a heavy truck tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a heavy duty truck tire 10 and tread 12 that include an ability to absorb and evacuate water at high speeds. The design seeks to prevent water from occupying the part of the tread 12 that is just about to enter contact with the ground. The design may result in better traction and vehicle braking distance when operating in wet conditions. The tread design 12 in some instances may not otherwise diminish the rolling resistance of the tire 10, although this may not be the case in every application of the present design. The tread 12 has a partially hidden longitudinal groove 22 with a surface opening 28 angled relative to the thickness direction 18 to better direct water flowing into and through the surface opening 28 away from the rolling direction 20. The partially hidden longitudinal groove 22 has an undersurface channel 24 to receive this water and further direct it rearwards, and a transition 40 between the surface opening 28 and the undersurface channel 24 can be designed in such a way to better channel this fluid flow. Additionally or alternatively, the tread 12 can feature a lateral sipe 32 in fluid communication with the surface opening 28 to receive water and channel it rearwards away from the rolling direction 20. The water is channeled to the shoulder edge 58 of the tread 12 and removed, or to a circumferential groove 46 which receives the water and allows it to flow away from the portion of the tread 12 about to enter the contact patch.

FIG. 1 shows a tire 10 that is a heavy duty truck tire 10. In this regard, the tire 10 is not designed for nor used with a car, motorcycle, or light truck (payload capacity less than 4,000 pounds), but is instead designed for and used with heavy duty trucks such as 18 wheelers, garbage trucks, or box trucks. The tire 10 may be a steer tire, a drive tire, a trailer tire, or an all position tire. The tire 10 includes a casing 62 onto which a tread 12 is disposed thereon. The central axis 64 of the tire 10 extends through the center of the casing 62, and the lateral direction 16, which may be referred to as the axial direction 16, of the tire 10 is parallel to the central axis 64. The thickness direction 18, which may be referred to as the radial direction 18, of the tire 10 is perpendicular to the central axis 64, and the tread 12 is located farther from the central axis 64 in the radial direction 18 than the casing 62. The tread 12 extends all the way around the casing 62 in the longitudinal direction 14, which may be referred to as the circumferential direction 14, of the tire 10 and circles the central axis 64 360 degrees.

The tread 12 features five ribs 66 that are separated by four longitudinal, circumferential grooves 46 that extend in the circumferential direction 14. The five ribs 66 can be classified as a central rib, two intermediate ribs, and two shoulder ribs. However, any number of ribs 66 can be present in other exemplary embodiments. The ribs 66 can each be made up of a number of tread blocks 68 that can have various shapes, sizes, and configurations. The inclusion of these architectural features gives the tread 12 different performance properties in use. The tread 12 may include certain structural features that can reduce abnormal wear or achieve other desired properties in the tread 12. One such structural feature shown with reference to FIG. 1 may be lateral sipes 32 that extend across the tread blocks 68 of the ribs 66 in the lateral direction 16. The tread 12 has a first shoulder edge 58 and an oppositely disposed second shoulder edge 70 in the lateral direction 16. Grooves and sipes are identified as some of the tread 12 features herein. Sipes are voids in the tread 12 that are smaller in width than grooves, and in some instances sipes are 2 millimeters or less in width while grooves are greater than 2 millimeters in width.

Figure 2:
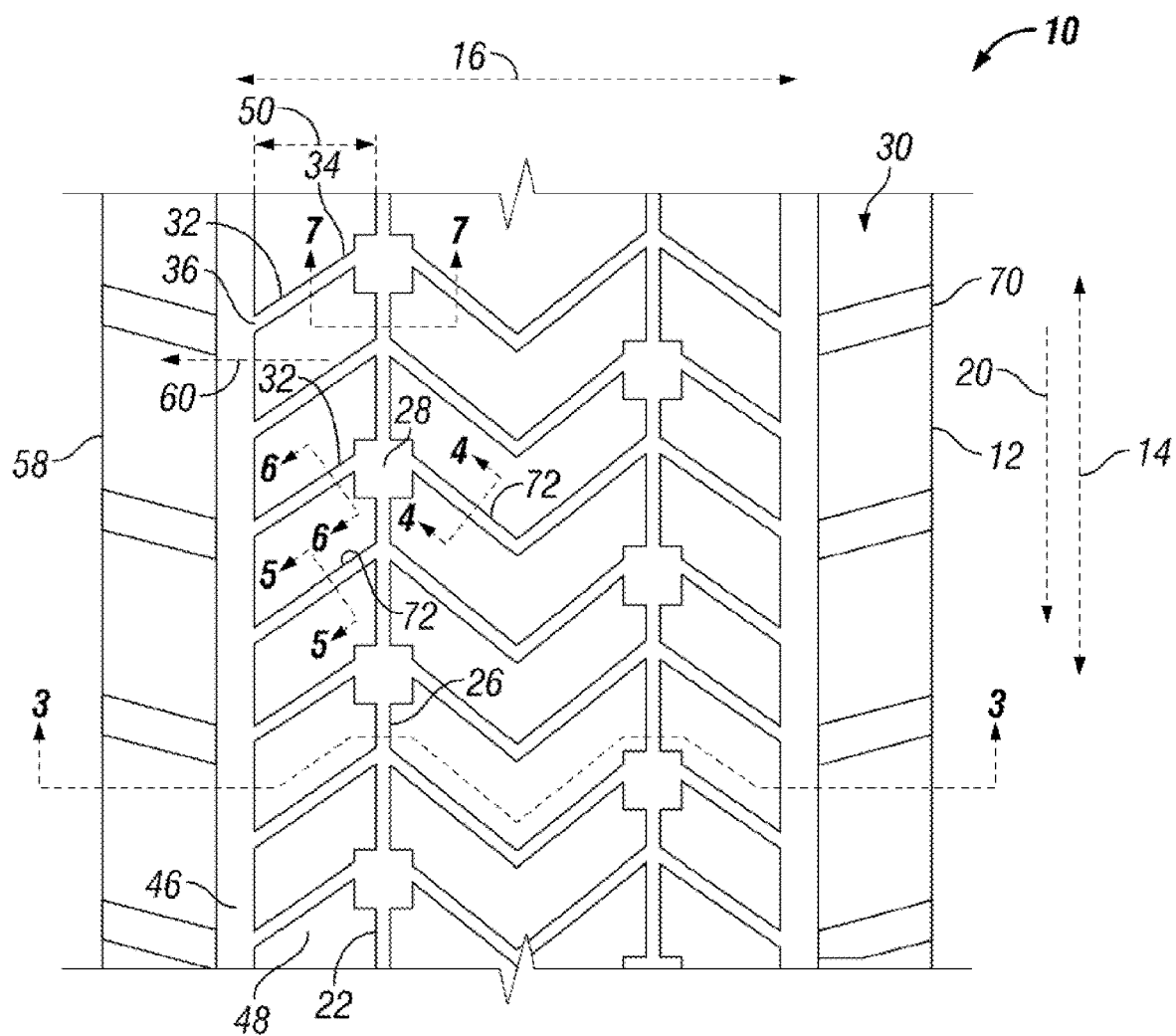
FIG. 2 is a front view of a heavy truck tire tread in accordance with one exemplary embodiment.

With reference now to FIG. 2, the tread 12 includes a partially hidden longitudinal groove 22 that includes features that are both visible at the surface 30 of the tread 12, and below the surface 30 and thus not able to be seen in FIG. 2. The partially hidden longitudinal groove 22 extends along the entire tread 12 and is arranged in the longitudinal direction 14. The partially hidden longitudinal groove 22 has a plurality of surface openings 28 spaced from one another along its length. The surface openings 28 are connected to one another by a series of longitudinal sipes 26 that extend in the longitudinal direction 14. A series of lateral sipes 32, 72 extend across the tread 12 and engage the partially hidden longitudinal groove 22. The lateral sipes 32, 72 engage a circumferential groove 46. The tread 12 features are symmetrical such that two partially hidden longitudinal grooves 22 are spaced from one another in the lateral direction 16, and two circumferential grooves 46 are adjacent to grooves 22 and spaced outboard respectively from each one of the two grooves 22 in the lateral direction 16.

The partially hidden longitudinal groove 22 and the circumferential groove 46 define an intermediate rib 48 therebetween. A center rib is between the two partially hidden longitudinal grooves 22, and two shoulder ribs are between the two circumferential grooves 46 and the shoulder edges 58, 70. Each one of the shoulder ribs includes a series of grooves that extend across their entire widths. The center rib has the lateral sipes 72 located therein across its entire width, and the lateral sipes 72 are arranged into V shaped configurations. In other embodiments, the lateral sipes 72 need not be in V shaped configurations, but can be in variously shaped configurations.

Figure 3:
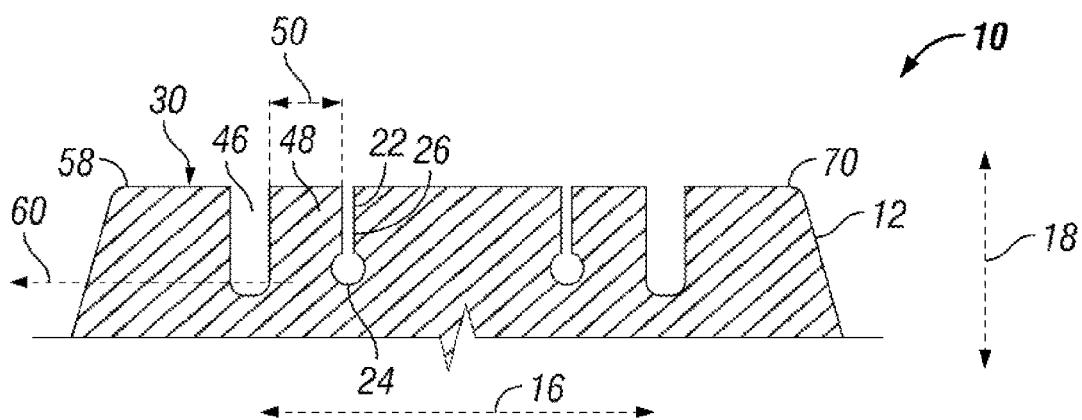
FIG. 3 is a cross-sectional view of the tread along line 3-3 of FIG. 2.

With reference in particular to FIG. 3, the partially hidden longitudinal groove 22 includes an undersurface channel 24. The undersurface channel 24 opens up into the longitudinal sipe 26 and these two features are in engagement with one another. The undersurface channel 24 can be thought of as being a separate component of the partially hidden longitudinal groove 22, or may be thought of as being a part of the longitudinal sipe 26. The undersurface channel 24 extends between successive surface openings 28 and engages them both. The undersurface channel 24 is arranged so the majority of it is not visible from the surface 30. The partially hidden longitudinal groove 22 is configured as a structure of voids made up of the undersurface channels 24, longitudinal sipes 26, and surface openings 28. The intermediate rib 48 has a width 50 that is the distance in the lateral direction 16 from the circumferential groove 46 to the partially hidden longitudinal groove 22, in particular the longitudinal sipe 26 or the surface opening 28.

The lateral sipes 32 are angled so that they have a component of extension in both the longitudinal direction 14 and the lateral direction 16. The angled orientation of the lateral sipes 32 may impact rolling resistance or other properties of the tire 10 during use. The rolling direction 20 of the tread 12 is the forward direction the tire 10 rolls during normal, forward use of the vehicle. The rolling direction 20 is thus the direction the vehicle moves when it is moving forward. The lateral sipe 32 has a first end 34 that is located at and engages the surface opening 28, and a second end 36 that is oppositely disposed from the first end 34 and is located at and engages the circumferential groove 46. The lateral sipe 32 extends across the entire width 50 of the intermediate rib 48. The angled arrangement of the lateral sipe 32 is relative to the rolling direction 20. In this regard, the second end 36 is forward of the first end 34.

The lateral sipe 32 is in fluid communication with the partially hidden longitudinal groove 22 via the first end 34 opening into the groove 22. The first end 34 may open into the surface opening 28 and/or the undersurface channel 24. This opening of the first end 34 into the surface opening 28 and/or undersurface channel 24 can be of a trumpet shape in some embodiments, or may be variously shaped. The second end 36 opens into and is in fluid communication with the circumferential groove 46 so that water can be transferred from the partially hidden longitudinal groove 22 through the lateral sipe 32 and into the circumferential groove 46. The second end 36 could have a trumpet shape opening into the circumferential groove 46, or may be variously shaped in accordance with other exemplary embodiments. Observation of FIG. 2 reveals that lateral sipes 32 extend from the circumferential groove 46 to the surface openings 28, and that lateral sipes 72 extend from the circumferential groove 46 to the partially hidden longitudinal groove 22 but not at the surface opening 28 portion of groove 22. Instead, the lateral sipes 72 extend from the longitudinal sipes 26 to the circumferential groove 46. The lateral sipes 72 making up the V shaped features in the center rib engage both the surface openings 28 and the longitudinal sipes 26 of different grooves 22 such that one continuous lateral sipe 72 in the center rib extends from the surface opening 28 in one partially hidden longitudinal groove 22 to the longitudinal sipe 26 in the other partially hidden longitudinal groove 22.

The surface openings 28 are out of phase with one another such that a surface opening 28 in the left hand groove 22 is not at the same position in the longitudinal direction 14 as a surface opening 28 in the right hand groove 22. However, in other embodiments, the surface openings 28 could be in phase with one another such that the left and right hand side surface openings 28 are at the same position in the longitudinal direction 14. In this instance, the V shaped longitudinal sipe 72 may extend from the left hand side surface opening 28 to the right hand side surface opening 28. In a similar manner, in these instances additional V shaped longitudinal sipes 72 extend from the left hand side longitudinal sipe 26 to the right hand side longitudinal sipe 26.

Figure 4:
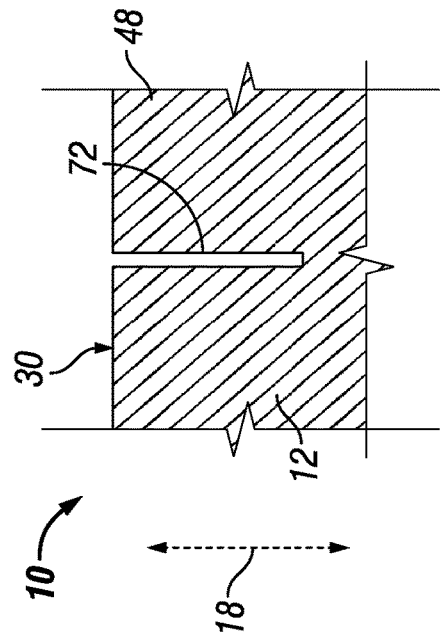
FIG. 4 is a cross-sectional view of the tread along line 4-4 of FIG. 2.

The lateral sipes 72 in the center rib making up the V shaped features are designed so that they do not transfer water therethrough, or so that they minimize the amount of water being transferred therethrough. FIG. 4 is a cross-sectional view showing the shape of the lateral sipes 72 in the center rib. These lateral sipes 72 have a small width, in some instances being 2 millimeters or less in width, and do not have an undersurface channel 24. When the tread 12 enters the contact patch, forces on the tread 12 may force the lateral sipes 72 closed so that the rubber on either side touches thus reducing the width of these lateral sipes 72 to zero to prevent them from transferring water.

Figure 5:
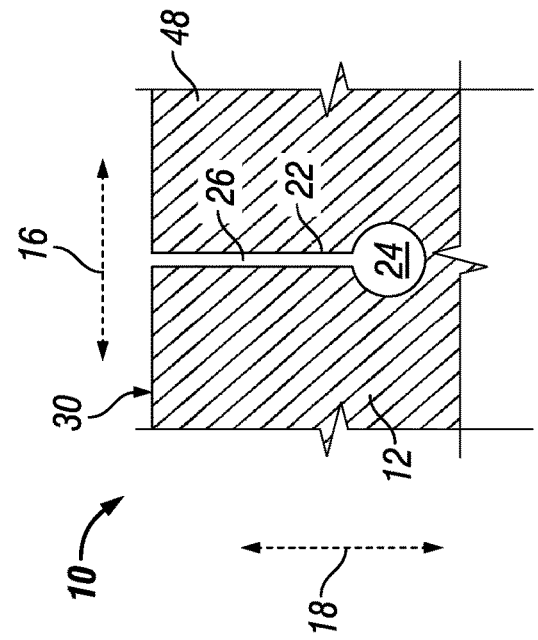
FIG. 5 is a cross-sectional view of the tread along line 5-5 of FIG. 2.

The lateral sipes 72 in the intermediate rib 48 are shown in cross-section in FIG. 5 and are arranged in a similar manner as those in the center rib. These lateral sipes 72 extend in the thickness direction 18 into the tread 12 and are two millimeters or less in width and do not have undersurface channels 24. These lateral sipes 72 may also close when the tread 12 enters the contact patch such that the width is reduced to zero and water is not able to be transferred through these lateral sipes 72.

Figure 6:
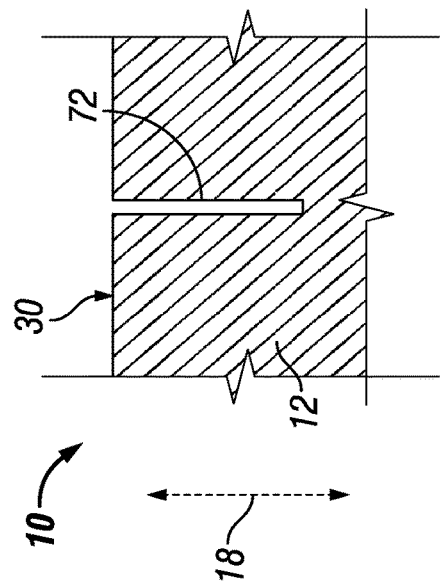
FIG. 6 is a cross-sectional view of the tread along line 6-6 of FIG. 2.

The lateral sipes 32 are shown in cross-sectional view in FIG. 6, and extend into in the thickness direction 18 into the tread 12 from the surface 30. The lateral sipe 32 has a small width 56, which may be two millimeters or less. A lateral undersurface channel 52 is present at the end of the lateral sipe 32 opposite the end that opens up at the surface 30. The lateral sipe 32 is in fluid communication with the lateral undersurface channel 52, and the lateral undersurface channel 52 may be thought of as a portion of the lateral sipe 32, or may be thought of as a separate element of the tread 12 that engages the lateral sipe 32. The lateral undersurface channel 52 has a width 54 that is greater than the width 56 of the lateral sipe 32, or the portion of the lateral sipe 32 that opens out of the surface 30. The lateral undersurface channel 52 has a width 54 or size sufficient to allow it to remain open when it enters the contact patch so that water may still remain into the lateral undersurface channel 52 and be transferred therethrough. The lateral sipe 32 may thus be arranged so that upon entering the contact patch a portion of it remains open even through some or all of the narrow portion closes. The lateral undersurface channel 52 can be in fluid communication with the surface opening 28 or other features of the partially hidden longitudinal groove 22 so that water is transferred from the groove 22 through the lateral undersurface channel 52 and into the circumferential groove 46. The lateral sipe 32 may be arranged so that it has different widths 54, 56 with the larger width 54 being further into the thickness of the tread 12, while the smaller width 56 is closer to the surface 30.

Figure 7:
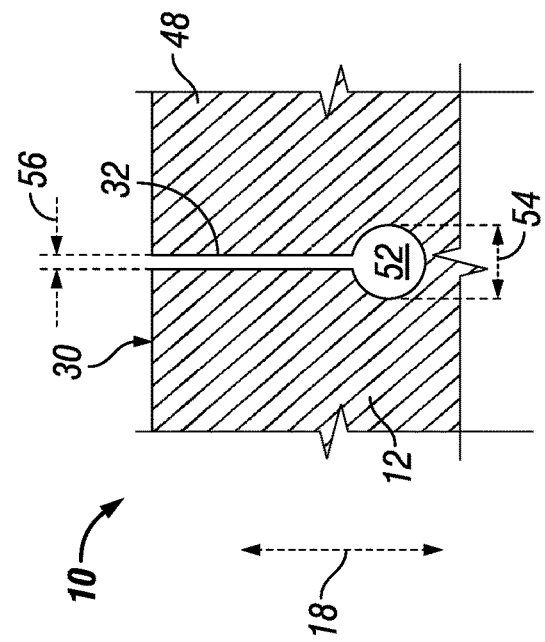
FIG. 7 is a cross-sectional view of the tread along line 7-7 of FIG. 2.

The longitudinal sipe 26 is shown in cross-sectional view in FIG. 7 and may have a cross-sectional shape the same as that of the lateral sipe 32. The undersurface channel 24 is located at an end of the longitudinal sipe 26 opposite from the end of the longitudinal sipe 26 that opens up to the surface 30. The undersurface channel 24 has a length, width, in the lateral direction 16 that is longer than the length, width, of the longitudinal sipe 26 in the lateral direction 16. The size and/or configuration of the undersurface channel 24 allows it to remain open when the surface 30 at this area enters the contact patch. Fluid may flow through the open undersurface channel 24 even if the longitudinal sipe 26 is closed when in the contact patch so that fluid cannot flow through the longitudinal sipe 26.

Figure 8:
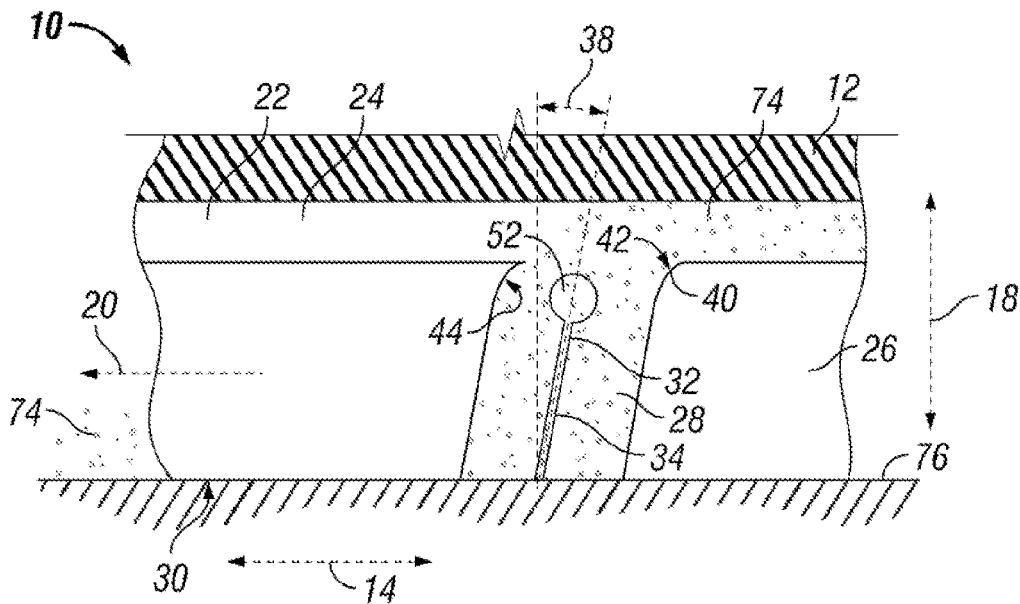
FIG. 8 is a cross-sectional elevational view of the tread engaging the ground in accordance with another exemplary embodiment.

An embodiment of the tread 12 is shown in FIG. 8 in which a cross-section of the tread 12 in the contact patch is shown and is approaching and engaging a pool of water 74 that is forward of the illustrated portions of the tread 12 in the longitudinal direction 14. The surface opening 28 is angled relative to the thickness direction 18 so that it is not parallel to the thickness direction 18. This orientation may be measured when the opening of the surface opening 28 at the surface 30 engages the ground, as it does in FIG. 8. The surface opening 28 is oriented at an angle 38 that is the angle of the surface opening 28 to the thickness direction 18. The line drawn through the surface opening 28 to define the angle is a straight line at the center of the surface opening that extends from the opening of the surface opening 28 to the undersurface channel 24. The line drawn in the thickness direction 18 is a vertical line that starts at the ground 76 and intersects the surface opening 28 line at that point. The angle 38 may be from 3 degrees to 15 degrees in certain embodiments. In other embodiments, the angle 38 is from 2 degrees to 17 degrees, from 1 degree to 20 degrees, from 1 degree to 10 degrees, from 4 degrees to 25 degrees, from 2 degrees to 8 degrees, up to 10 degrees but greater than 0 degrees, up to 15 degrees but greater than 0 degrees, or up to 45 degrees but greater than 0 degrees.

Water 74 can enter the tread 12 through the surface opening 28 and be moved into the interior of the surface opening 28. The rolling direction 20 is shown in FIG. 8 and is the direction of movement of the tread 12 in the longitudinal direction 14. The surface opening 28 therefore captures some of the water 74 as the tire 10 rolls forward in the rolling direction 20 to reduce the amount of water 74 building up in front of the tire 10 and to reduce or eliminate any visco planing. Water 74 entering the surface opening 28 is directed opposite to the rolling direction 20 in the longitudinal direction 14 as it flows through the surface opening 28. The orientation of the surface opening 28 via the angle 38 causes the water 74 in the surface opening 28 to flow in towards the interior of the tread 12 in the thickness direction 18, and to flow in the longitudinal direction 14 opposite to the rolling direction 20. The theory of operation behind this arrangement is that the water 74 is cleared from the undersurface channel 24 as much as possible in order to absorb water 74 as the next, subsequent surface opening 28 comes into contact with the ground 76. Some of the water 74 will enter the lateral undersurface channel 52 that is in fluid communication with the surface opening 28 and will be evacuated from the surface opening 28 through this void and transferred in the lateral direction 16 away from the partially hidden longitudinal groove 22. The lateral undersurface channel 52 could alternatively be located in the undersurface channel 24, or could be arranged so that it is in both the undersurface channel 24 and the surface opening 28. The water 74 will also be transferred through the surface opening 28 to the undersurface channel 24. The angle 38 causes the water 74 flowing into the undersurface channel 24 to move in an opposite direction in the longitudinal direction 14 from the rolling direction 20. The water 74 thus flows opposite of the forward rolling direction 20. However, in some instances it may be the case that some water flows in the same direction as the rolling direction 20 in the longitudinal direction 14, but even in these cases a majority of the water 74 in the undersurface channel 24 flows opposite of the rolling direction 20 in the longitudinal direction 14.

A transition 40 is present between the surface opening 28 and the undersurface channel 24. The transition 40 could be thought of as being its own feature in the partially hidden longitudinal groove 22, or may be a part of the surface opening 28, or may be a part of the undersurface channel 24. The transition 40 is shaped so as to better direct the flow of water 74 from the surface opening 28 and into the undersurface channel 24. The transition 40 helps to direct the flow of water 74 into the opposite direction from the rolling direction 20. The transition 40 includes a convex surface portion 42 that is at the rearward most portion of the surface opening 28. The convex surface portion 42 is arranged so that the convex surface directly faces into the partially hidden longitudinal groove 22 as opposed to away from it. The transition 40 also has a concave surface portion 44, and it is located at a forward portion of the surface opening 28 at the undersurface channel 24. The concave surface of the concave surface portion 44 directly faces into the partially hidden longitudinal groove 22 as opposed to away from it. The portions 42 and 44 are arranged to channel the water 74 in the desired direction out of the surface opening 28 and away from the rolling direction 20 in the undersurface channel 24. The concave surface portion 44 is located forward of the convex surface portion 42 in the rolling direction 20 in the longitudinal direction 14. The transition 40 need not be present in other exemplary embodiments. Further, in some instances only the convex surface portion 42 of the transition 40 is present, and the concave surface portion 44 is not present. In other embodiments, the concave surface portion 44 of the transition 40 is present and the convex surface portion 42 is not present.

The transition 40 is located in the interior of the tread 12, and the surface opening 28 that engages the ground 76 does not have a transition 40. In other embodiments, the surface opening 28 at the ground does have a transition 40 that may include a convex surface portion 42 and a concave surface portion 44. In FIG. 8, water 74 flowing past the transition 40 enters the undersurface channel 24 and flows away from the surface opening 28 in the longitudinal direction 14 opposite that of the rolling direction 20. The partially hidden longitudinal groove 22 thus functions to absorb water 74 from the ground 76 and move it generally away from the rolling direction 20.

The portion of the surface opening 28 that engages the ground 76 is generally forward of the portion of the surface opening 28 at the transition 40 and/or the undersurface channel 24. However, some sections of the surface opening 28 at the transition 40 and/or the undersurface channel 24 are in fact forward, in the rolling direction 20, than some sections of the surface opening 28 at the ground 76.

Figure 9:
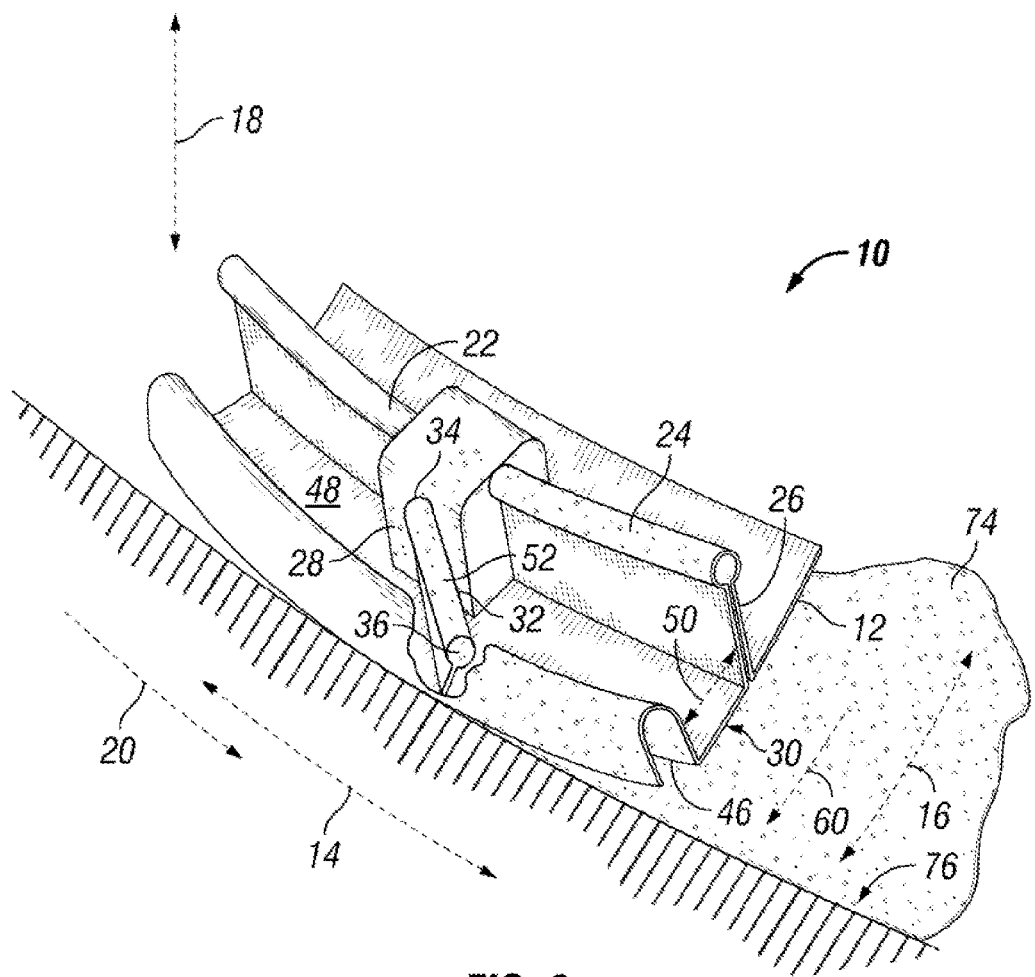
FIG. 9 is a perspective view of certain elements of the tread engaging the ground in accordance with another exemplary embodiment.

FIG. 9 is a partial perspective view of the tread 12 and shows a portion of the partially hidden longitudinal groove 22 and the adjacent circumferential groove 46 with the intermediate rib 48 therebetween. The tread 12 engages the ground 76 and a pool of water 74 is in front of the tread 12 such that the tread 12 is moving in the rolling direction 20 towards the pool of water 74. The partially hidden longitudinal groove 22 functions to drain some of this water 74 so that it does not build up in front of the tire 10 as the tire 10 moves forward through the pool of water 74. The water 74 is captured by the surface opening 28 and flows from the surface opening 28 into the undersurface channel 24 and the lateral sipe 32 and flows in a direction opposite to the rolling direction 20. The water 74 is transferred through the undersurface channel 24 away from the surface opening 28 in the direction opposite to the rolling direction 20. The lateral sipe 32 is angled away from the surface opening 28 so that water flows through the lateral sipe 32 in the longitudinal direction 14 in a direction opposite to that of the rolling direction 20. The water 74 flows through the lateral undersurface channel 52 away from the surface opening 28 in an outboard direction 60 in the lateral direction 16, and also opposite to the rolling direction 20 in the longitudinal direction 14. Some water 74 can flow through other portions of the lateral sipe 32 if it remains open during insertion into the contact patch, or all of the water in the lateral sipe 32 is transferred through only the lateral undersurface channel 52 if the rest of the lateral sipe 32 is closed up at this point. The second end 36 opens into the circumferential groove 46 and water 74 flows out of the second end 36 into the circumferential groove 46 and may then flow in a direction opposite to that of the rolling direction 20 in the circumferential groove 46. The direction of flow of the water 74 in the circumferential groove 46 may be due to the angled orientation of the lateral sipe 32 such that upon exiting the second end 36 via the lateral undersurface channel 52 the flow of water 74 is initially directed generally opposite that of the rolling direction 20. In other embodiments, the flow of water 74 in the circumferential groove 46 can be in the rolling direction 20, or some may flow in the rolling direction 20 and away from the rolling direction 20 in the longitudinal direction 14.

Figure 10:
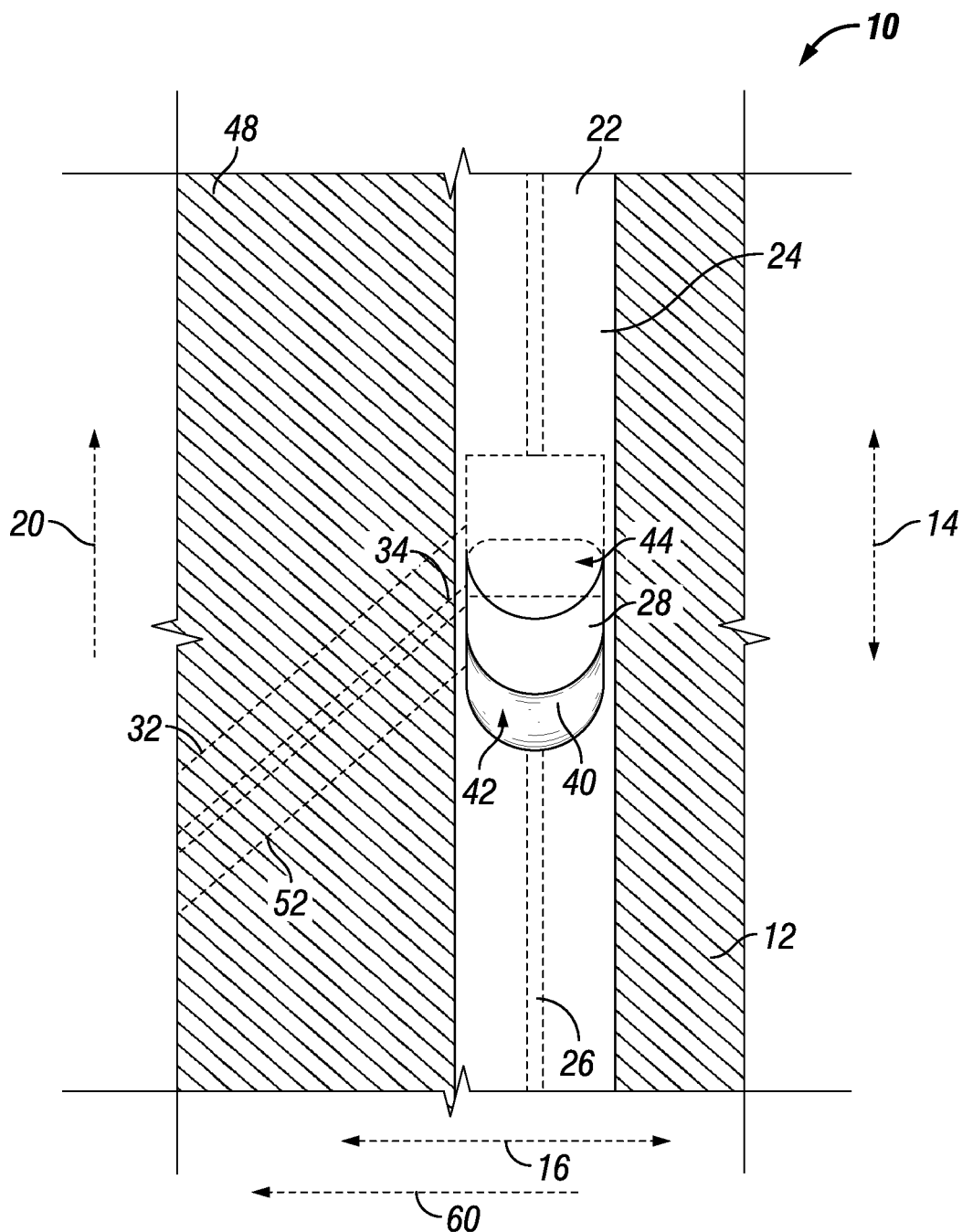
FIG. 10 is a cross-sectional front view of certain elements of the tread taken at the undersurface channel of the partially hidden longitudinal groove in accordance with another exemplary embodiment.

Another embodiment of the tread 12 is shown in cross-section in FIG. 10 in which the cross-section is taken through the undersurface channel 24 in the thickness direction 18 so that the bottom of the undersurface channel 24 can be seen and so that one can look into the surface opening 28. The convex surface portion 42 and the concave surface portion 44 of the transition 40 are shown as extending from one end of the surface opening 28 to an opposite end in the lateral direction 16. The convex surface portion 42 and the concave surface portion 44 do not extend across the entire width of the undersurface channel 24 in the lateral direction 16, but it is to be understood that they may extend across the entire width of the undersurface channel 24 in the lateral direction 16 in other exemplary embodiments. The concave surface portion 44 is located at the same position in the longitudinal direction 14 as that of the surface opening 28 at the ground 76. The rearward most edge of the surface opening 28 in the longitudinal direction 14 at the ground 76 is shown in FIG. 10 as the dashed line running horizontally through the concave surface portion 44. The forward most edge of the surface opening 28 in the longitudinal direction 14 at the ground 76, which is also shown as a horizontal dashed line in FIG. 10, is forward of both the concave surface portion 44 and the convex surface portion 42 in the longitudinal direction 14. The surface opening 28 can be variously shaped in other embodiments. For instance, the surface opening 28 may be rectangular, circular, or squared shaped or any other shape in other versions of the tread 12.

Figure 11:
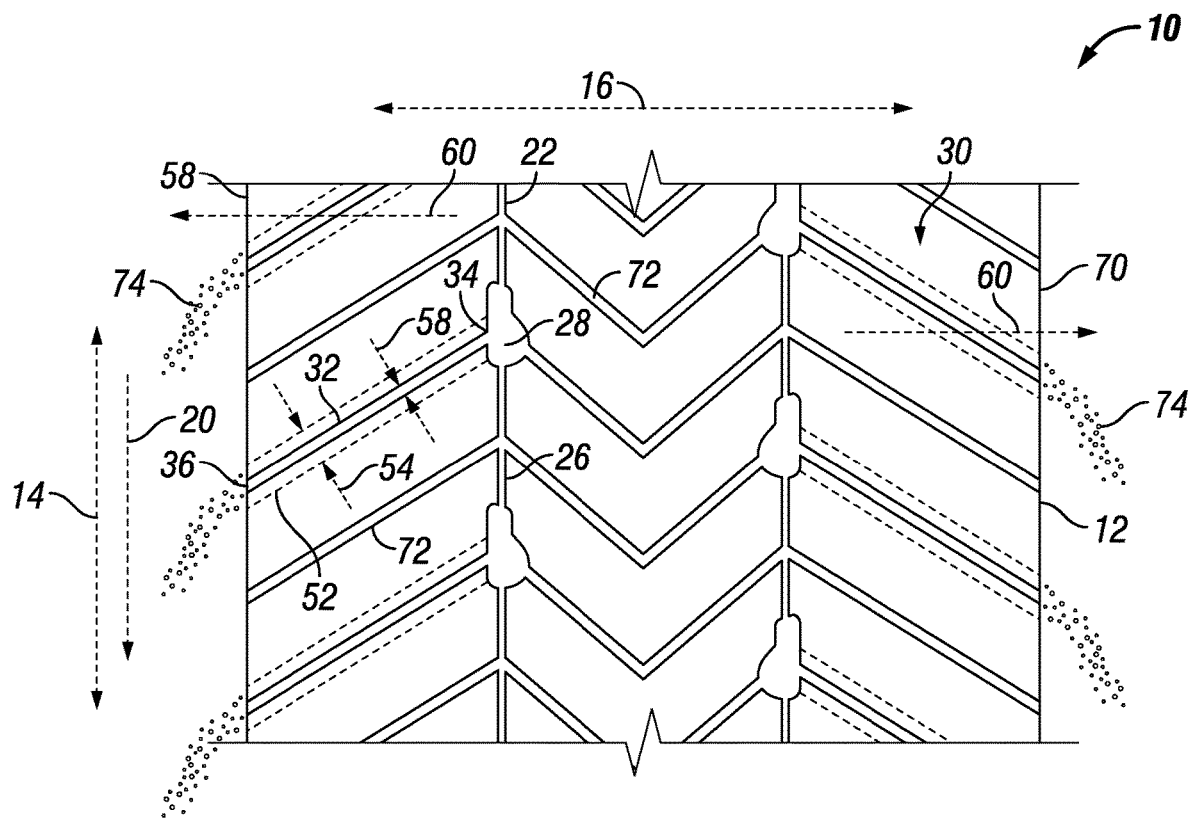
FIG. 11 is a front view of the tread in accordance with another exemplary embodiment.

An alternative embodiment of the tread 12 is illustrated in FIG. 11 and includes surface openings 28 that have a triangular shape with rounded sections. The partially hidden longitudinal groove 22 also includes the longitudinal sipes 26 and functions as previously discussed in obtaining water 74 from the ground 76. Lateral sipes 32 with lateral undersurface channels 52 engage and are in fluid communication with the partially hidden longitudinal grooves 22 at the surface opening 28. The lateral sipes 32 are arranged so that the first end 34 is rearward of the second end 36 in the rolling direction 20 as previously discussed. Water 74 is transferred from the surface openings 28 into the first end 34 and then through the lateral undersurface channel 52 to the second end 36. The water 74 exits the second end 36, which is also located at the first shoulder edge 58, and is dispensed from the tread 12 outboard 60 in the lateral direction 16. The water transfer scheme of the tread 12 seeks to channel the water 74 away from the center of the tread 12 to the shoulder edges 58, 70, or to circumferential grooves 46 at various locations along the width of the tread 12 in the lateral direction 16. The circumferential grooves 46 can expel the water 74 away from the rolling direction 20 off of the tread 12 and may have a volume sufficient to hold the water 74 that is channeled therein.

The tread 12 in FIG. 11 is generally symmetrical in that features on the left hand side are also found on the right hand side. Water 74 is captured by the two partially hidden longitudinal grooves 22. Lateral sipes 72 are present in the tread 12 both in the center rib, where they form a V shape, and in the two shoulder ribs where they engage the shoulder edges 58, 70 and the longitudinal sipes 26 but not the surface openings 28. The lateral sipes 72 do not have the lateral undersurface channels 52 and are not designed to transport any water 74 therethrough. As such, no water 74 will be transferred from the partially hidden longitudinal grooves 22 inboard in the lateral direction 16 in the V shaped lateral sipes 72. Instead, the water 74 from the grooves 22 is transferred outboard 60 in the lateral direction 16 from the surface openings 28 to the first shoulder edge 58 from the left hand groove 22, and outboard 60 in the lateral direction 16 from the surface openings 28 to the second shoulder edge 70 from the right hand groove 22.

Although it has been described that water 74 does not enter the lateral sipes 72 because they are closed upon entering the contact patch, do not have lateral undersurface channels 52, and are not in communication with water 74 inputs such as the surface openings 28, it is to be understood that in some instances water 74 will in fact find its way within the lateral sipes 72 and may be transported therefrom or remain therein. However, such water 74 is not of the volume of holding or transport associated with the lateral sipes 32. In some instances, no water 74 is located within the lateral sipes 72. In various embodiments, the only sipes 32 that engage the surface openings 28 are those that include the lateral undersurface channel 52, and sipes 72 that do not have lateral undersurface channels 52 do not engage the surface openings 28. In some embodiments of the tread 12, the water 74 is always transferred from the partially hidden longitudinal grooves 22 outboard 60 in the lateral direction 16. However, other embodiments are possible in which water 74 is transferred from one or more partially hidden longitudinal grooves 22 inboard in the lateral direction 16 to a feature from which it may be discharged or subsequently transferred.

The illustrations show the lateral sipes 72, 32 and longitudinal sipes 26 as extending in straight lines. This need not be the case in other embodiments and the sipes 26, 32 and 72 may be zig-zag, wavy, curved, or of any shaped extension from one point to another. The sipes 26, 32 and 72 may also be of any cross-sectional shape. Further, the undersurface channels 24 and lateral undersurface channels 52 can have any cross-sectional shape, and need not extend in straight lines but could likewise have zig-zag, wavy, or curved shapes, or be of any desired shaped extension.

Figure 12:
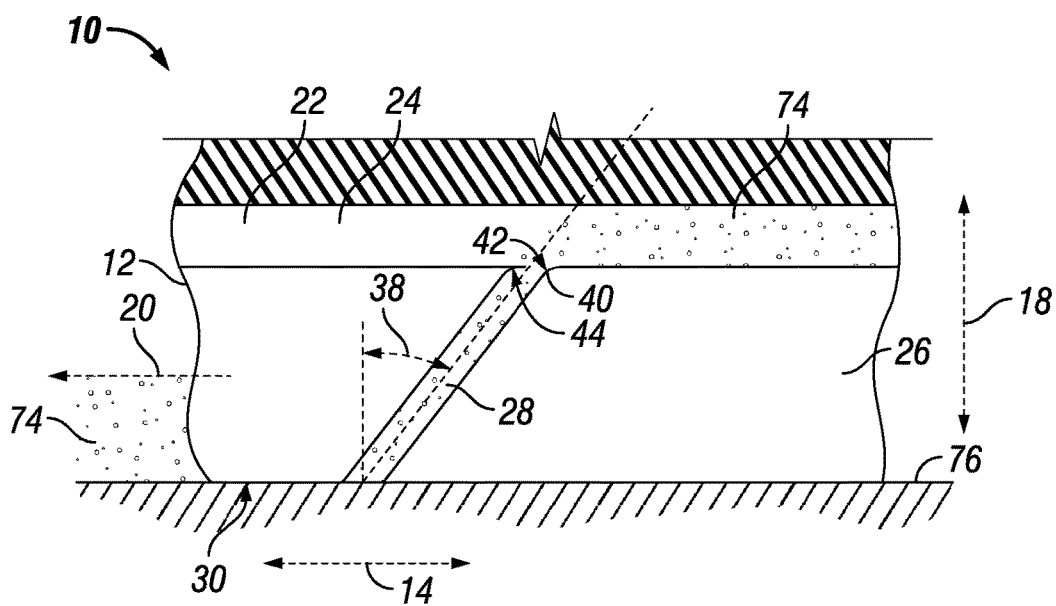
FIG. 12 is a cross-sectional elevational view of the tread engaging the ground in accordance with another exemplary embodiment.

Another embodiment of the tread 12 is shown in cross-section in FIG. 12 that shows a portion of the tread 12 in the contact patch with a pool of water 74 in front of the tread 12 in the rolling direction 20. The features of the tread 12 can be provided as previously discussed and a repeat of this information is not necessary. The tread 12 in FIG. 12 differs from some previously described embodiments in that the angle 38 is large enough and the length of the surface opening 28 great enough in the thickness direction 18 to allow the surface opening 28 at the ground 76 to be completely forward of the surface opening 28 at the undersurface channel 24 in the longitudinal direction 14. In this regard, the entire surface opening 28 at the ground 76 is forward of the entire surface opening 28 at the undersurface channel 24 such that no overlap exists. Further, the entire surface opening 28 at the ground 76 is completely forward of the transition 40 such that no portion of the transition 40 is at or forward in the rolling direction 20 of any portion of the surface opening 28 at the ground 76 in the longitudinal direction 14. The angle 38 is 35 degrees in the FIG. 12 embodiment, but as previously discussed can be different in other embodiments.

The tread 12 is arranged with features that facilitate the channeling of water 74 in desired directions to improve performance of the tire 10 during use. Although embodiments of the tread 12 exist in which all of these features are present, it is to be understood that embodiments likewise exist in which just one or two, or less than all of these features are present. For example, the tread 12 may include the angled surface opening 28 in the partially hidden longitudinal groove 22, but lack the transition 40 and lack the laterally angled lateral sipes 32 with the lateral undersurface channels 52. In other embodiments, the tread 12 has the angled surface openings 28 and the transition 40, but lacks the laterally oriented lateral sipes 32 with the lateral undersurface channels 52. In yet other arrangements, the tread 12 has the laterally oriented lateral sipes 32 with the lateral undersurface channels 52, but lacks the angled surface openings 28 in the partially hidden longitudinal grooves 22 and the transition 40. In other embodiments, the immediately discussed arrangement does have the transition 40. As such, it is to be understood that the tread 12 may have various combinations of the disclosed features, and it is not necessary for the tread 12 as disclosed to have every feature presently revealed. Also, features in any of the illustrated embodiments, or discussed therewith, can be combined or substituted for any features in another one or ones of the illustrated or discussed embodiments to yield a desired tread 12 design.

The aforementioned illustrations and descriptions show the water 74 within the tread 12, as it is within the contact patch, such that the portions of the tread 12 that engage the ground 76 have water 74 therein. Applicant's theorize that in some instances the water 74 may in fact be cleared partially or fully from the tread 12 that is within the contact patch such that there is less or no water 74 in this portion of the tread 12 and instead the water 74 is moved to the tread 12 features rearward/opposite to the rolling direction 20 of the contact patch in the longitudinal direction 14. In some applications, the flow orienting tread features provided and discussed herein prevent water 74 from occupying the part of the tread 12 that is just about to enter the contact with the ground 76. However, the design is not limited to having or not having water 74 within the tread features in the contact patch of the tire 10 during use, and may have water 74 at any or all locations at or rearward of the contact patch of the tire 10 in the longitudinal direction 14.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:
1. A heavy truck tire tread, comprising:
   a longitudinal direction, a lateral direction, and a thickness direction, wherein the tread has a rolling direction that is in the longitudinal direction;
   a partially hidden longitudinal groove that has an undersurface channel and a longitudinal sipe that engages the undersurface channel, wherein the partially hidden longitudinal groove has a surface opening that extends from a surface of the tread to the undersurface channel;
wherein the surface opening extends from the surface to the undersurface channel at an angle to the thickness direction such that the surface opening at the surface is forward of the surface opening at the undersurface channel in the rolling direction when the surface opening at the surface is in a contact patch of the tread; and
a first lateral sipe that has a first end and an opposite second end in the lateral direction, wherein the first lateral sipe engages the surface opening and the first end of the first lateral sipe is at the surface opening, wherein the second end of the first lateral sipe is forward of the first end of the first lateral sipe in the rolling direction;
a second lateral sipe that engages the surface opening and extends from the surface opening with a longitudinal component of extension that is in the same direction in the longitudinal direction as is the longitudinal direction of a longitudinal component of extension of the first lateral sipe upon extension from the surface opening and is farther than the surface opening in the longitudinal direction, and wherein the second lateral sipe has a lateral component of extension from the surface opening that is inboard in the lateral direction;
wherein a transition is present from the surface opening to the undersurface channel, wherein the transition has a convex surface portion and has a concave surface portion located forward of the convex surface portion in the rolling direction when the surface opening is in the contact patch of the tread, wherein empty space is present between the convex and concave surface portions, and wherein the convex surface portion has a convex cross-sectional shape and wherein the concave surface portion has a concave cross-sectional shape.

2. The tread as set forth in claim 1, wherein all of the surface opening at the surface is forward of all of the surface opening at the undersurface channel in the rolling direction when all of the surface opening at the surface is in the contact patch.

3. The tread as set forth in claim 1, wherein the angle of the surface opening is from 3 degrees to 15 degrees to the thickness direction.

4. The tread as set forth in claim 1, wherein the tread has a lateral undersurface channel that engages the first lateral sipe and the surface opening.

5. The tread as set forth in claim 4, wherein the lateral undersurface channel is wider than the first lateral sipe.

6. The tread as set forth in claim 5, wherein the first lateral sipe extends in a straight line from the first end to the second end.

7. The tread as set forth in claim 1, wherein the tread has a shoulder edge, and wherein the first lateral sipe extends to the shoulder edge in the lateral direction such that the second end of the first lateral sipe opens up out of the shoulder edge.

8. The tread as set forth in claim 1, wherein the first lateral sipe extends from the first end to the second end in an outboard direction of the lateral direction.

9. The tread as set forth in claim 1, wherein the undersurface channel and the longitudinal sipe extend in the longitudinal direction and do not have a component of extension in the lateral direction, wherein the first lateral sipe extends in both the longitudinal and lateral directions so as to have components of extension in both the longitudinal direction and the lateral direction.

10. The tread as set forth in claim 1, wherein the tread has a circumferential groove, and wherein the tread has an intermediate rib located between the circumferential groove and the partially hidden longitudinal groove in the lateral direction, wherein the first lateral sipe extends across an entire width of the intermediate rib such that the second end of the first lateral sipe opens up into the circumferential groove.

11. A heavy truck tire that has the tread of claim 1.

12. A heavy truck tire tread, comprising:
a longitudinal direction, a lateral direction, and a thickness direction, wherein the tread has a rolling direction that is in the longitudinal direction;
a partially hidden longitudinal groove that has an undersurface channel and a longitudinal sipe that engages the undersurface channel, wherein the partially hidden longitudinal groove has a surface opening that extends from a surface of the tread to the undersurface channel, wherein the surface opening extends from the surface to the undersurface channel at an angle to the thickness direction such that the surface opening at the surface is forward of the surface opening at the undersurface channel in the rolling direction when the surface opening at the surface is in a contact patch of the tread;
wherein a transition is present from the surface opening to the undersurface channel, wherein the transition has a convex surface portion and has a concave surface portion located forward of the convex surface portion in the rolling direction when the surface opening is in a contact patch of the tread, wherein empty space is present between the convex and concave surface portions, and wherein the convex surface portion has a convex cross-sectional shape and wherein the concave surface portion has a concave cross-sectional shape.

13. A heavy truck tire tread, comprising:
a longitudinal direction, a lateral direction, and a thickness direction, wherein the tread has a rolling direction that is in the longitudinal direction;
a partially hidden longitudinal groove that has an undersurface channel and a longitudinal sipe that engages the undersurface channel, wherein the partially hidden longitudinal groove has a surface opening that extends from a surface of the tread to the undersurface channel;
a lateral sipe that has a first end and an opposite second end in the lateral direction, wherein the lateral sipe engages the surface opening and the first end of the lateral sipe is at the surface opening, wherein the second end of the lateral sipe is forward of the first end of the lateral sipe in the rolling direction;
wherein the lateral sipe extends from the first end to the second end in an outboard direction of the lateral direction;
wherein a transition is present from the surface opening to the undersurface channel, wherein the transition has a convex surface portion and has a concave surface portion located forward of the convex surface portion in the rolling direction when the surface opening is in a contact patch of the tread, wherein empty space is present between the convex and concave surface portions, and wherein the convex surface portion has a convex cross-sectional shape and wherein the concave surface portion has a concave cross-sectional shape.

\* \* \* \* \*